(12) United States Patent
Döttling et al.

(10) Patent No.: US 7,324,472 B2
(45) Date of Patent: Jan. 29, 2008

(54) TRANSMISSION METHOD

(75) Inventors: Martin Döttling, Neubiberg (DE);
Jürgen Michel, München (DE);
Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 813 days.

(21) Appl. No.: 10/492,716

(22) PCT Filed: Oct. 2, 2002

(86) PCT No.: PCT/EP02/11094

§ 371 (c)(1),
(2), (4) Date: Apr. 15, 2004

(87) PCT Pub. No.: WO03/034640

PCT Pub. Date: Apr. 24, 2003

(65) Prior Publication Data

US 2005/0041572 A1 Feb. 24, 2005

(30) Foreign Application Priority Data

Oct. 15, 2001 (DE) ............... 101 50 839
Feb. 19, 2002 (EP) ............... 02003753

(51) Int. Cl.
*H04Q 7/00* (2006.01)

(52) U.S. Cl. .............. 370/328; 370/411; 375/262
(58) Field of Classification Search ............ None
See application file for complete search history.

(56) References Cited

U.S. PATENT DOCUMENTS 6,973,030 B2 * 12/2005 Pecen et al. ............ 370/229
7,016,425 B1 * 3/2006 Kraiem ............... 375/261

OTHER PUBLICATIONS

Siemens—"An Optimization of the Bit Distribution Function for HSDPA", TSG-RAN working Group 1, Online—Feb. 20, 2002, XP-002227068.
Samsung—Text Proposal for SMP (Symbol Mapping based on bit Priority), TSG-RAN Working Group 1, Online, Jan. 12, 2002, XP-002227069.
Samsung—Consideration of SMP (Symbol Mapping based on priority), TSG RAN Working Group 1, Online, Aug. 30, 2001, XP-002227070.

* cited by examiner

*Primary Examiner*—Bob A. Phunkulh
(74) *Attorney, Agent, or Firm*—Bell, Boyd & Lloyd LLP (57) ABSTRACT

A transmission method is provided whereby data of different classes are transmitted and different reliability positions exist, with the bits of the different classes being mapped to respective reliability positions.

10 Claims, 6 Drawing Sheets

TRANSMISSION METHOD

BACKGROUND OF THE INVENTION

The present invention relates to a method for distributing bits on reliability positions to which a probability is related, that a bit on a reliability position will be transferred correctly. This process is also referred to as priority mapping.

It is an important aspect for communications systems to provide high data transfer rates. In the case of a mobile communications system, this is particularly important for downlink connections; i.e., for connections from a base station to a terminal. For UMTS (Universal Mobile Communications Systems), the so called High Speed Downlink Packet Access (HSDPA) is being developed which provides peak data rates of 10.8 Mbps (Mega bits per second).

The HSDPA data channel is basically an enhancement of the existing UMTS downlink shared channel (DSCH). HSDPA allows to code multiplex different users or mobile stations on up to 15 codes with a spreading factor of 16. The primary multiple access, however, is in the time domain, where different users can be scheduled every transmission time interval (TTI), which corresponds to 3 UMTS slots; i.e., 2 ms. Also, the number of codes allocated to one user can change from TTI to TTI. Depending on the system load and channel conditions, the base station or Node B adapts modulation and code rate for each user. A certain combination of code rate and modulation is referred to as the MCS (Modulation and Coding Scheme) level. The MCS level may change every TTI. It is determined by the base station based on feedback information or channel quality information (CQI) from the user terminal or mobile station, which stems from channel condition measurements. The channel quality information is sent with a periodicity ranging from one to 80 TTIs.

To achieve the high data rates, modulation and coding schemes are used which allow a high information bit rate per code. Therefore, so-called higher modulation techniques are used by which a symbol contains more than 2 bits. One example is 16-QAM (Quadrature Amplitude Modulation). For these modulation techniques, the individual positions for a bit within a symbol are not equally protected. Therefore, there is the ambition to map important bits to well protected positions and less important bits to less protected positions. This is referred to as bit priority mapping and will be detailed below using an example from HSDPA. Furthermore, for channel coding so called turbo codes with rate R=1/3 are used. The rate indicates the ratio of the total number of bits to the number of load or systematic bits.

Figure 1:
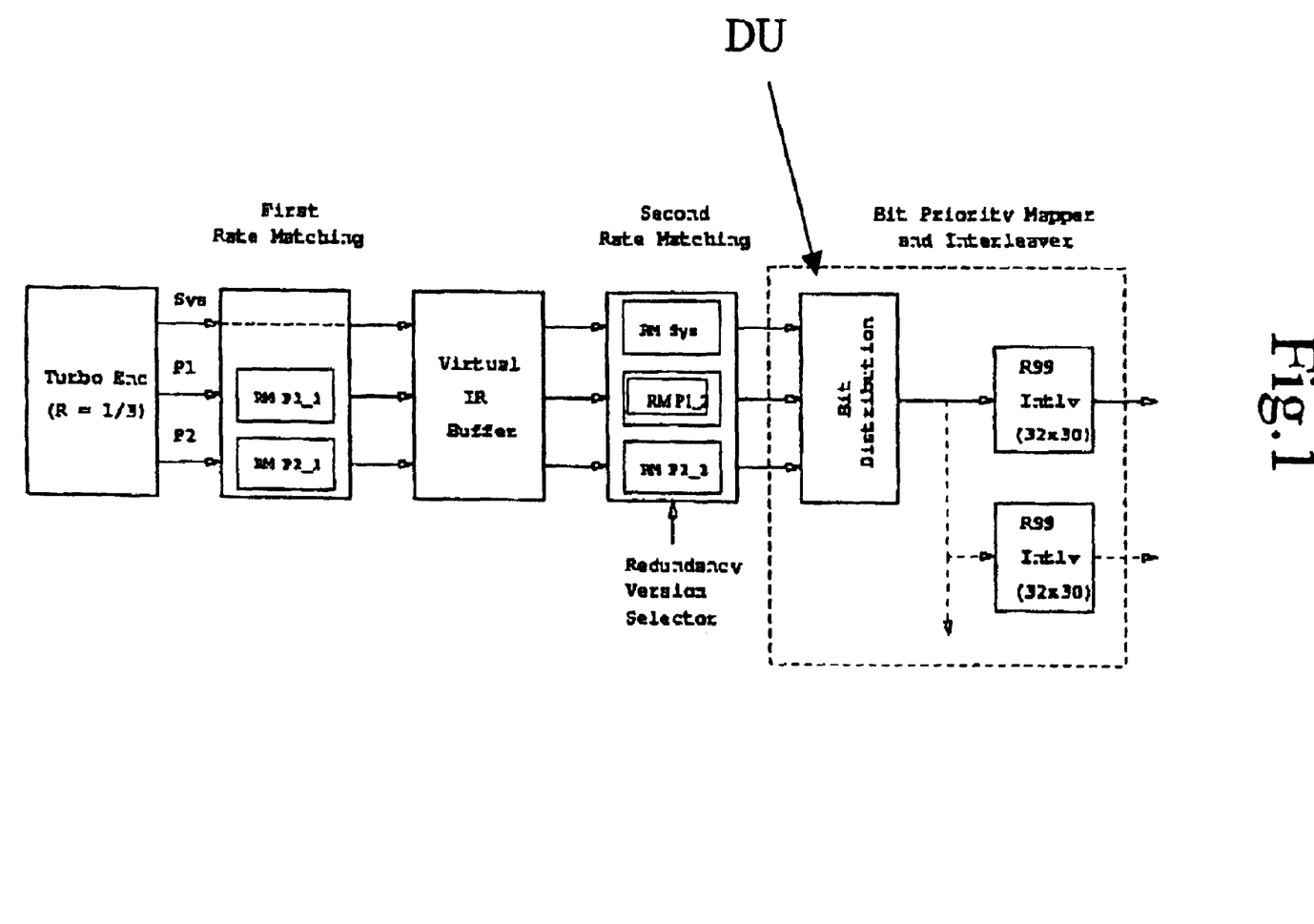
FIG. 1 shows a schematic view of the components of the HSDPA coding chain.
Figure 2:
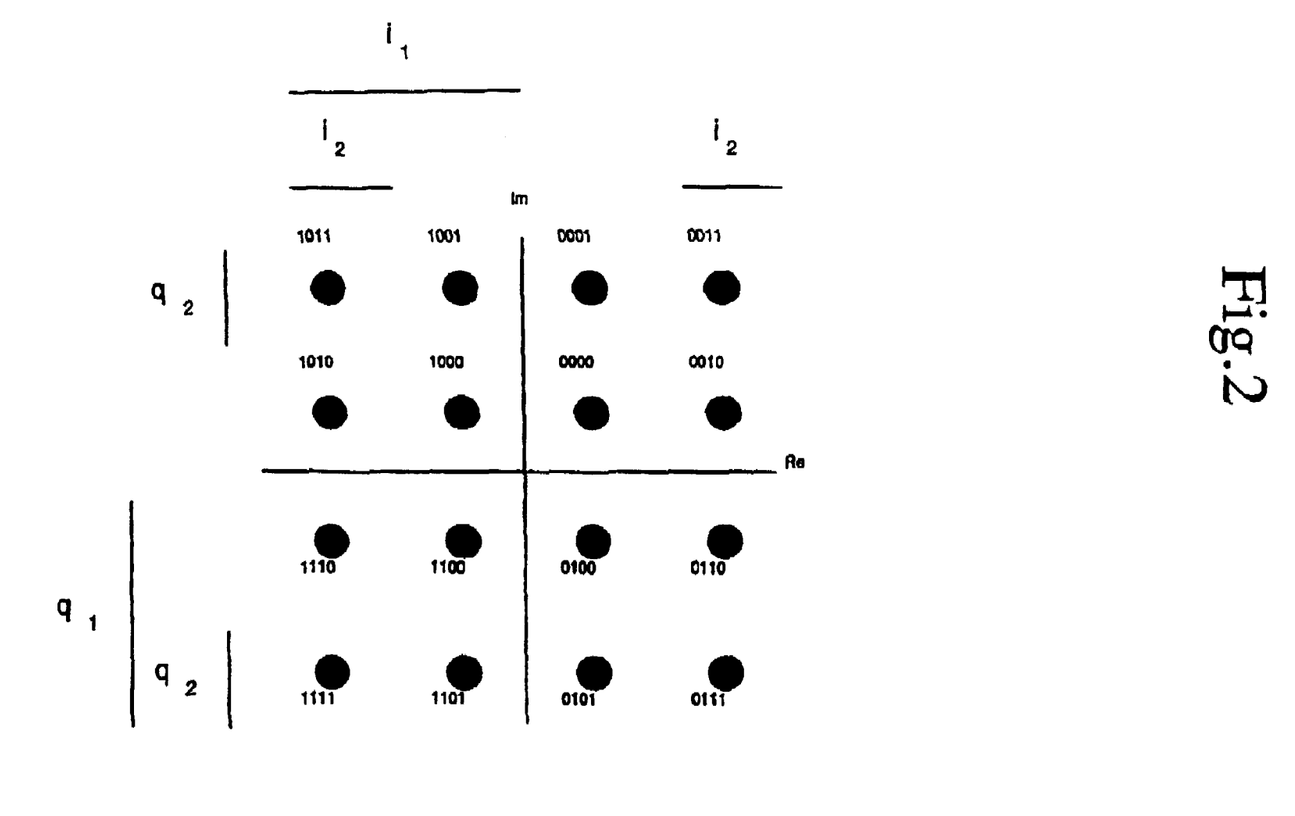
FIGS. 2a-d show 16QAM modulation schemes.

The HSDPA Coding Chain (cf. FIG. 1 and FIG. 2)

It has been proposed to include bit priority mapping into the current HSDPA coding chain, which will be reviewed in the following with reference to FIG. 1.

The output of a turbo encoder (Turbo Enc) consists, in this case, of three bit classes: systematic bits containing the load or actual information and two groups of parity bits (parity 1 bits and parity 2 bits), which are used for error correction. The data are fed into a first rate matching unit (First Rate Matching) where the parity bits experience a first rate matching. The data are stored in a virtual IR (Incremental Redundancy) buffer (Virtual IR Buffer) before being fed into a second rate matching unit (Second Rate Matching), where all bit classes experience a second rate matching (RM Sys, RM P1_2, RM P2_2).

The respective output of the rate matched bit classes enters a bit priority mapping and interleaving unit (Bit Priority Mapper and Interleaver), where the different input data (that is, the systematic bits and the different groups of parity bits), are introduced into a bit distribution unit (Bit Distribution, DU). After the bit distribution unit DU, before the mapping on a physical channel, the bits are interleaved with interleaving units (according to the Release R99 with a (32×30) Interleaver (R99 Intlv (32×30)).

In the bit distribution unit DU, a so-called priority mapping is performed. By priority mapping the following is understood:

If a modulation scheme higher than QPSK (Quadrature Phase Shift Keying) is used, more bits are coded into a symbol than for QPSK, the different bit positions being differently reliable, as can be seen from FIG. 2, where four 16QAM modulation schemes are depicted. Each of the 16 combinations of the values of real part and imaginary part is referred to as a symbol and represents a bit sequence. The bit-mapping order is i1q1i2q2 for all constellations. The difference between the schemes a-d is only the assignment of the real part value to i1 and i2, and the assignment of the imaginary part value to q1 and q2. It is evident that bit positions, where a value change between 0 and 1 takes places at the borders of a quadrant, are better safeguarded than these, where a value change occurs within a quadrant. As such, depending on the bit mapping order, the MSB (Most Significant Bits), for example, are safeguarded better than the LSB (Least Significant Bits).

Now the problem arises to assign bits to certain positions within a symbol. For turbo encoders, bit classes with different priorities exist; that is, their correct reception is not equally important. These different bit classes are the before mentioned systematic bits with the highest priority and the parity 1 and parity 2 bits with a lower priority. Therefore, systematic bits preferably are assigned to high reliability positions. A detailed description of the distribution method used up until now can be found in the following section.

After the bit distribution, an interleaving process is performed according to the rules implemented in the UMTS standard.

Figure 3:
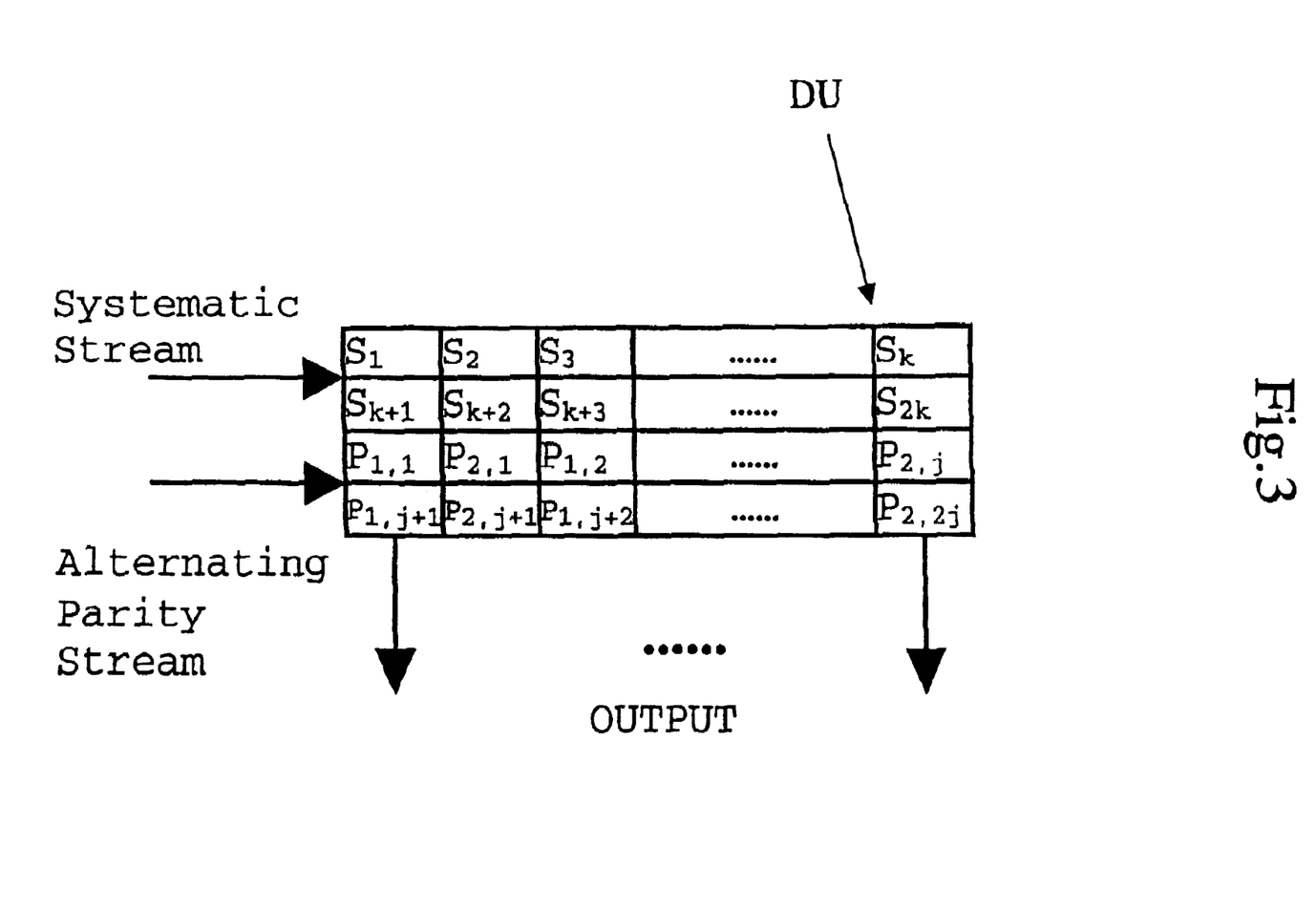
FIG. 3 shows an example of a bit distribution unit for a 16QAM modulation scheme and rate R=1/2.
Figure 4:
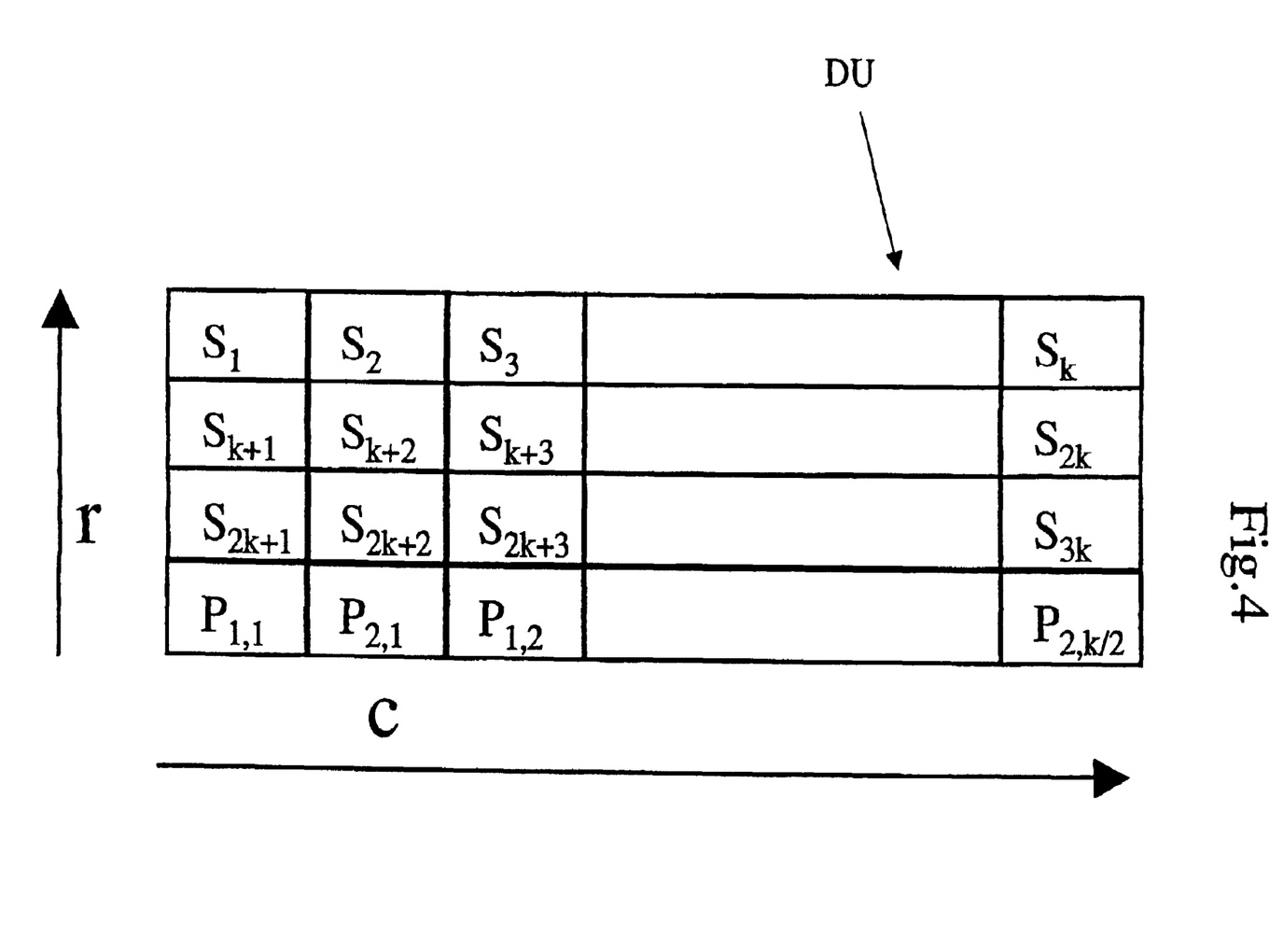
FIG. 4 shows an example of a bit distribution unit for a 16QAM modulation scheme and rate R=3/4.

The Bit Distribution Unit (cf. FIG. 3 and FIG. 4)

This section focuses on the bit distribution unit (DU), which again is explained in connection with HSDPA. In [1] it has been proposed to append a bit distribution unit after the HARQ (Hybrid Automatic Repeat Request) functionality that allows bit priority mapping. In FIG. 3, details of the currently-used bit distribution unit are depicted. The bit distribution unit is basically an interleaver where the number of rows corresponds to the number of bits per symbol. The stream of systematic bits is written row-wise first in lines 1 and 2, then the two streams of parity 1 bits and parity 2 bits are written alternatively in the remaining area; i.e., preferably into lines 3 and 4. In case not all systematic bits could be accommodated in lines 1 and 2, systematic bits are also written in lines 3 and 4. This case will be dealt with below.

The output of the data, which are then subject to interleaving, is column-wise.

In [1] the bit distribution unit is described as follows:

Data is read into the interleaver row by row, and [is read] out of the interleaver column by column. To perform priority mapping, the whole stream of systematic bits from the Turbo encoder is read in first, followed by alternating bits from the two parity streams. FIG. 3 illustrates the bit distribution process for 16-QAM using rate [R=]½ code. It may be noted that the alternating parity stream could be read from the bottom right hand corner of the interleaver so that systematic and parity bits do not come from the same symbol.

Thus, for R=½, all systematic bits can be put on high reliability positions and it is not required to design a prosperous distribution on low reliability positions for systematic bits that cannot be accommodated on high reliability positions.

However, having a close look at the bit distribution unit, it is evident, that for R≠1/2, the bit mapping becomes sub-optimal, as now systematic bits are also positioned on low reliability positions; that is, in this example the third and forth row. FIG. 4 shows an example for R=3/4. Again, the input and output of the data is analogous to that described in FIG. 3, apart from the fact that in this case the complete last third of the systematic bits would be mapped to low reliability bit positions in a block-wise fashion; i.e., neighbored bits are arranged in the distribution unit on neighbored positions. For R<1/2, the first parity bits would be mapped to high reliable bit positions in a block-wise fashion. In both cases, the distribution is quite inhomogeneous over the frame, thus creating weak spots in the decoding process. The mapping to high and low reliability probability positions will be detailed further in relation to FIG. 5, which shows a bit distribution unit DU.

Figure 5:
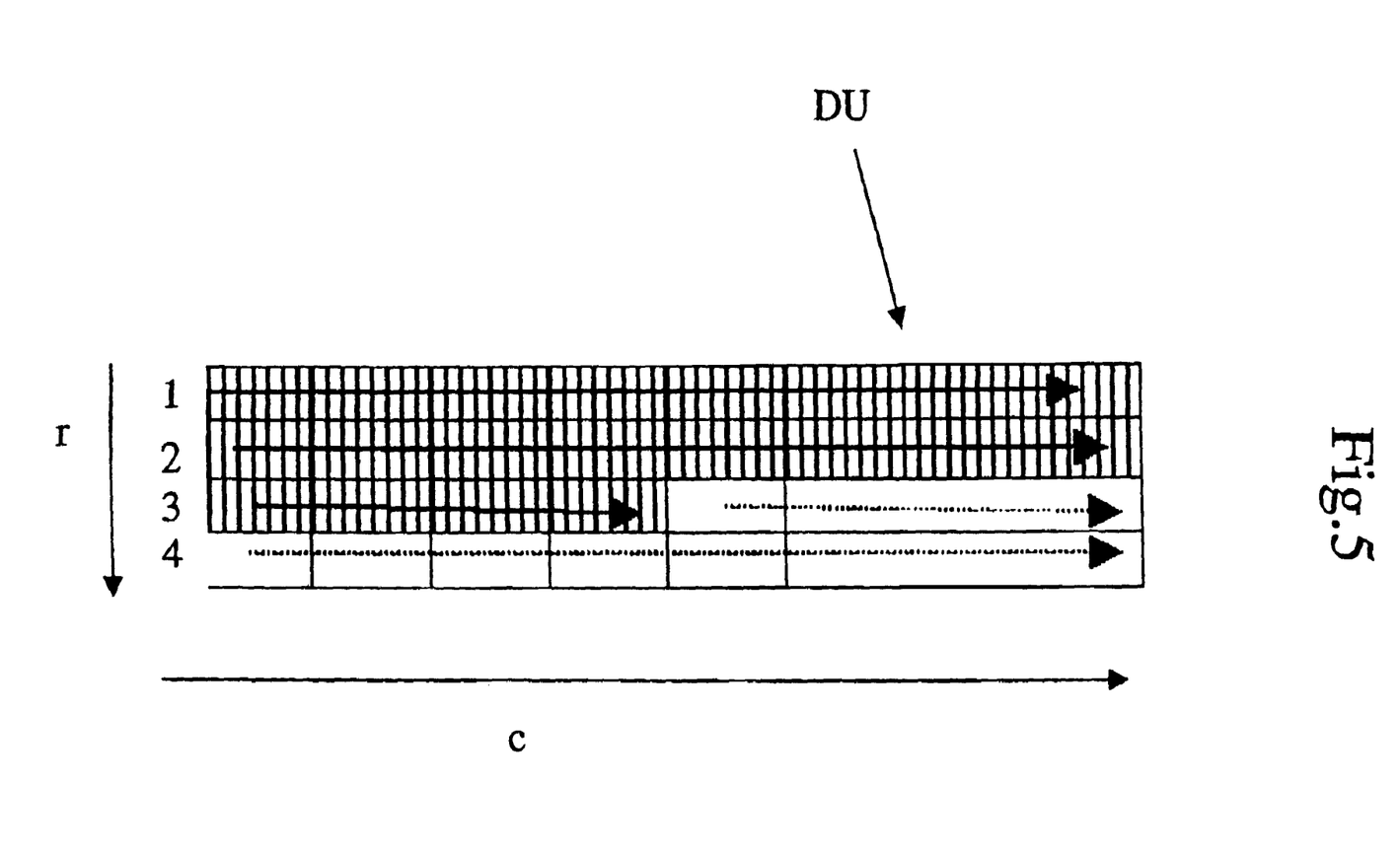
FIG. 5 shows a conventional interleaver used for a bit mapping procedure with bold and dotted arrows indicating bits of two different classes that are written into the interleaver row by row (state of the art).

The bit distribution unit DU can be represented by an r*c matrix, where r denotes the number of rows and c the number of columns. For 16 QAM modulation, the number of rows is four, as in this case four bits are forming a symbol. The number of columns is chosen such that the desired number of bits can be accommodated. The bits are fed into the matrix row by row beginning with the systematic bits and then continuing with the parity bits. Positions filled with systematic bits are marked by a hatched area. As explained above, the systematic bits might not fit exactly into the first two lines that are mapped to high reliability positions for the 16 QAM modulation, but either cover more than two lines or less than two lines. In combination with the row by row filling modus, this will lead to the above-mentioned block-wise mapping.

Previously, in German application 10150839.5, a bit mapping scheme has been proposed which mitigates this problem by applying a rate matching-like algorithm for bit distribution [2]. This method abolishes the above-mentioned disadvantages of a non-uniform distribution of systematic bits on low reliability positions and parity bits on high reliability positions, respectively, and yields a rather uniform distribution of bits on the respective reliability positions. Therefore, an algorithm similar to the so-called rate matching algorithm is applied to distribute systematic bits (one class of bits) and parity bits on high and low reliable bit streams (i.e., bit streams that will eventually be mapped to high and low reliable bit positions in a modulation).

However, that distribution method required a rather complex process to account for all possible combinations of different modulation schemes, bit rates, coding rates, etc.

To sum up, there have been discussions about how to distribute bits onto the high and low reliability classes for 16 QAM. There are very simple distribution rules as suggested by Samsung (e.g., [6]) and recently by Motorola [1] which, however, cause blocks of systematic bits to be mapped to low reliability positions. This effect has been shown to decrease the performance by independent simulations [2]. There have been other distribution rules proposed, which achieve an even distribution of the low reliability systematic bits within the total set of systematic bits, for example, by using a variant of the rate matching scheme [3]. These rules have been shown to perform in a superior manner, but they are not so simple.

SUMMARY OF THE INVENTION

Based on the foregoing description, one faces the dilemma of either having a good bit distribution scheme requiring high implementation complexity or only a decent distribution scheme requiring a modest implementation complexity. It is, therefore, an object of the present invention to solve this dilemma.

It is also an object of the present invention to create a method for distributing bits on different classes of positions which does not require a highly complex distribution process and still offers a reasonable uniformity of the bit distribution.

Another object of the present invention is to ensure a reasonably homogenous distribution of bits in a frame on different reliability positions, thus avoiding possible weak spots in the decoding process.

In a further embodiment of the present invention, it is an object to simplify the mapping rule in comparison to DE10150839.5 or [2], but to still provide good performance, thus defining a good compromise between performance and implementation complexity. Thus, it is intended by the present invention to provide a simple optimization which leads to a more homogeneous bit distribution without increasing implementation complexity.

The present invention is directed toward changing the writing rule for the bit distribution unit as follows:

Data is written into the interleaver column by column, and read out of the interleaver column by column. In the first $N_c$ columns, systematic bits are written into row $1$ to $N_r+1$, subsequently they are written into row $1$ to $N_r$, where $$N_r = \left\lfloor \frac{N_{t,sys}}{N_{col}} \right\rfloor,$$

that is the number of rows that are fully occupied with the $N_{t,sys}$ transmitted, systematic bits (the used "bracket" is a notation for rounding downwards to the next lower or equal integer number), and $$N_c = \left(\frac{N_{t,sys}}{N_{col}} - N_r\right) \cdot N_{col} = N_{t,sys} - N_r \cdot N_{col}.$$

$N_{t,sys}$ is the number of transmitted systematic bits and $N_{col}$ is defined as in [1]:

$$N_{col} = \frac{N_{trans}}{\log_2(M)},$$

where $N_{trans}$ is the number of coded and rate-matched bits to be transmitted, and M is the number of modulation symbol constellation points; i.e., $\log_2(M)$ is number of bits per symbol.

This scheme prevents block-wise mapping to wrong bit reliabilities without requiring a high implementation complexity.

To sum up:

$N_{t,sys}$ is the number of the transmitted systematic bits;

$N_{trans}$ is the number of the transmitted systematic bits plus the number of transmitted parity bits;

$N_r$ is the number of rows that are fully occupied with systematic bits;

$N_{col}$ is the total number of columns or entries in a row, respectively; and $N_c$ is the number of columns which have the dimension $N_r+1$, whereby dimension is defined as the number of entries allocated to systematic bits; i.e., $N_r+1$ entries are allocated entries to systematic bits.

Additional features and advantages of the present invention are described in, and will be apparent from, the following Detailed Description of the Invention and the Figures.

DETAILED DESCRIPTION OF THE INVENTION

Figure 6:
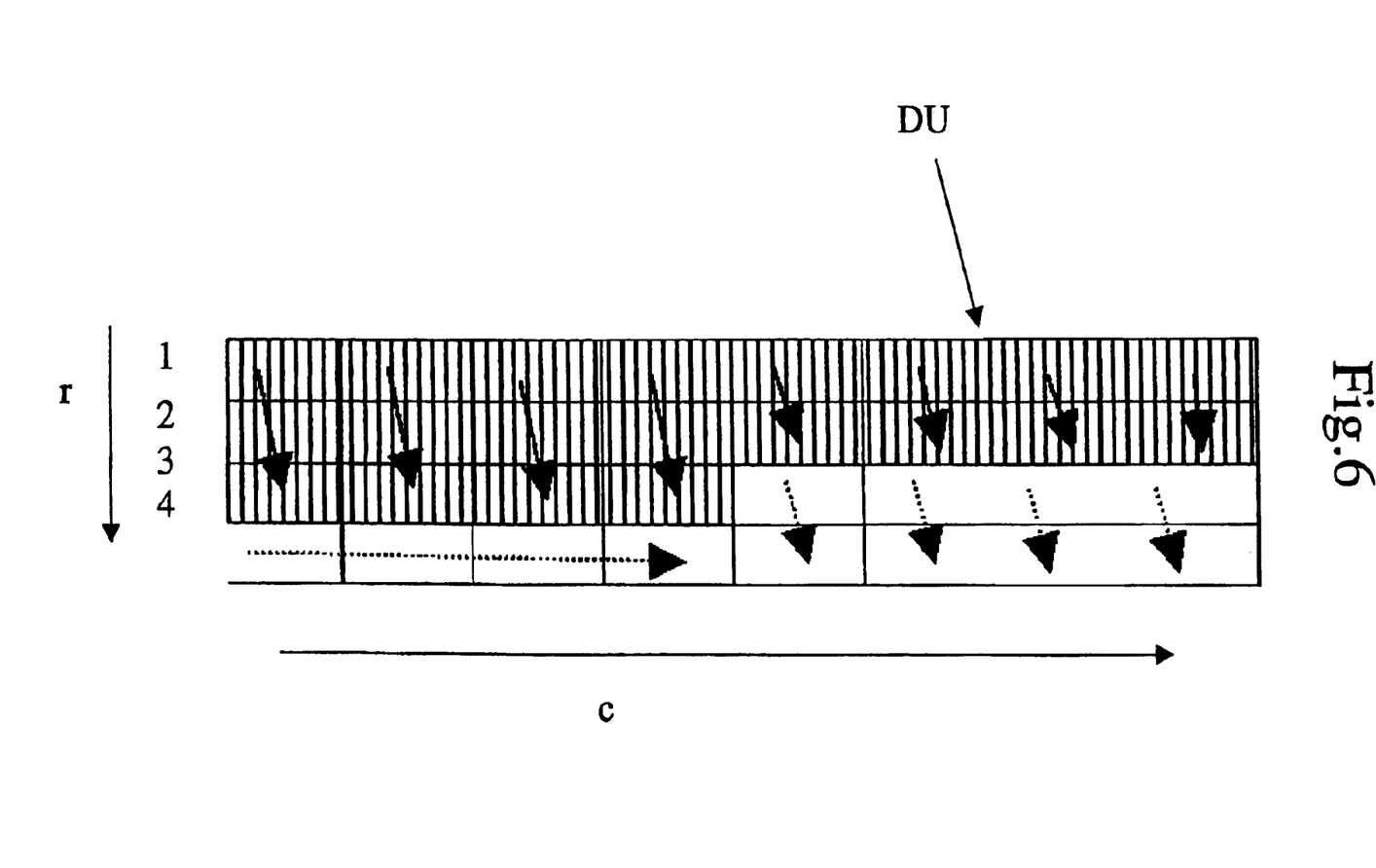
FIG. 6 shows the use of an interleaver according to the present invention.

Reference is now made to FIG. 6, where a bit distribution unit is shown.

A basic approach to a bit distribution method or method of mapping bits to different reliability positions according to the present invention is as follows:

As for both the inventive method and the bit distribution method according to the state of the art described in relation to FIGS. 1 to 5, the bits of the different classes (i.e., systematic bits and parity bits), are written into a bit distribution unit DU after the rate matching). The unit consists of a structure similar to an 4*X block-interleaver in the case of 16 QAM modulation, which can be represented by a matrix. X denotes the number of columns. However, bits are not written in row by row and read out column by column as in prior art, but are written somewhat differently. First, the area of the "interleaver," which is used for the systematic bits, is determined in the same way as if the systematic bits first were written into a standard interleaver. This determination is based on the calculation of the number of entries in the interleaver or the respective matrix, as described above in the Summary.

In FIG. 6, the number of entries or the area in the matrix is indicated by the hatched region. The bits are then written into the interleaver not horizontally but vertically (i.e., column by column), but only into the area that is reserved for the bits of this specific class. Afterwards, the data are read out column by column as shown in FIG. 6.

After reading out the data from the bit mapping unit, the bits coming from the upper half (i.e., of the upper two rows), are mapped to the high reliably bits and the bits from the lower half are mapped to the low reliability bits.

In one embodiment, an optimization of the bit distribution and interleaving function for HSDPA is proposed. Without additional complexity compared to [1], the negative effect of block-wise mapping of bits to positions with the wrong reliability is mitigated.

In one preferred embodiment, the interleaving scheme detailed in [3] is used. This allows achievement of the excellent performance which has been confirmed by comparative simulations [4] with the lowest possible implementation effort.

It will be apparent for those skilled in the art, that this scheme can be further varied in several ways, including the following:

the number of columns and/or rows can be varied;

the number of different classes of bits written into the distribution unit can be varied;

the number of different reliabilities can be varied (it also can be sets of bits with other properties than reliability);

The bit distribution does not, at the same time, act as a good interleaver, instead it should be followed by another interleaver which can be implemented as already-described in the previous application; and parity bits from a turbo encoder first can be grouped together and then written into the space reserved for parity bits column by column.

The scheme also can be used if there is only a single reliability class of bits in the output. In this case, the proposal is used to collect bits of different classes together and are all output to the same stream. In this case, the bit mapper still can be organized, for reasons of simplicity, with 4 rows. When reading it out column by column, however, all bits are, of course, output to a single stream. This also avoids complicated processing steps as proposed in [7].

Furthermore, the inventive method can be applied not only for turbo coded data but also for all data, where to different subsets a different priority is related.

The method further can be applied for all types of modulation higher that QPSK.

However, the method of the present invention also can be used for data, which have the same priority, but are sent more than once. For example, for one transmission a bit can be placed on a high reliability position, for the next transmission on a low reliability position and vice versa for another bit, thus increasing the probability of a correct reception.

Generally, the present invention can be applied in any communication system or mobile radio network for the data transfer between a central unit, such as a Node B or a base station, and a terminal, such as a mobile station.

In particular, the present invention can be applied in systems operating according to the UMTS standard.

Although the present invention has been described with reference to specific embodiments, those of skill in the art will recognize that changes may be made thereto without departing from the spirit and scope of the present invention as set forth in the hereafter appended claims.

REFERENCES

Note: the mentioned documents are maintained by 3GPP, the third generation partnership project, Address: ETSI, Mobile Competence Centre, 650, route des Lucioles, 06921 Sophia-Antipolis Cedex, and are cited in the format used by such organization.

[1] R1-02-0286, Motorola, "Enhancement of tow-stage Rate Matching Scheme for HS-DSCH" Orlando, Fla., February 2002.

[2] R1-01-1101, Siemens, "Details of Incremental Redundancy by means of Rate Matching," 3GPP TSG-RAN WG 1/WG 2 Ad Hoc on HSDPA, Sophia Antipolis, France, November, 2001.

[3] R1-01-1231, Siemens, "Interleaver operation in conjunction with SMP," Jeju, Korea, Nov. 19-23, 2001.
[4] R1-02-0081, Ericsson, "Comparison of different interleaving schemes," Espoo, Finland, January, 2002.
[5] 3GPP TSG RAN, "High Speed Downlink Packet Access: Physical Layer Aspects", TSG-R1 Technical Report, TR 25.858.
[6] R1-02-0024, Samsung, "Text proposal for SMP (Symbol Mapping based on bit Priority)", Orlando, Fla., February 2002.
[7] R1-02-0345, IPWireless, "HSDPA Bit Collection" Orlando, Fla., February 2002 (Note that the document itself incorrectly states Espoo as the venue).

We claim:

1. A transmission method wherein data of different classes are transmitted and different reliability positions exist, with bits of the different classes being mapped to respective reliability positions, the method comprising the steps of:
modulating the data for transmission to express more than one bit by a symbol, the symbol expressing a certain sequence of more than one bit;
providing that the data of the different classes to be transmitted include at least a first and a second class of bits;
representing a respective reliability position by a position within the symbol on which a bit may be mapped and linking the respective liability position with a transmission reliability;
providing that at least two different values of the transmission reliability exist;
wherein mapping of a bit onto a position within the symbol comprises the steps of:
establishing a matrix with $N_{row}$ rows and $N_{col}$ columns, having ($N_{row}*N_{col}$) total entries, whereby onto each entry a bit may be positioned, with all entries of a same row being linked with a same value of the transmission reliablity;
determining a number $N_{t,sys}$ of bits to be transmitted of the first bit class and allocating a respective number of entries for the bits to be transmitted in the matrix row-by-row, thus allocating the first $N_c$ columns with dimension $N_r+1$ and, if $N_r>0$, allocating remaining ($N_{col}-N_c$) columns with dimension $N_r$, wherein $N_r$ is the number of rows that are completely allocated to bits of the first bit class, and $1<N_c<N_{col}$;
calculating $N_c$ as $$N_c = \left(\frac{N_{t,sys}}{N_{col}} - N_r\right) \cdot N_{col} = N_{t,sys} - N_r \cdot N_{col} \text{ and } N_r = \left\lfloor \frac{N_{t,sys}}{N_{col}} \right\rfloor$$

and if $N_c=0$, allocating all columns with $N_r$ rows; and
filling the allocated entries with the bits of the first class of bits column-by-column.

2. A transmission method as claimed in claim 1, wherein the transmission reliability is a reliability that a bit placed on a respective position can be transferred correctly.

3. A transmission method as claimed in claim 1, wherein the first bit class is formed of systematic bits.

4. A transmission method as claimed in claim 1, wherein the second bit class is formed of parity bits.

5. A transmission method as claimed in claim 1, wherein a column of the matrix is mapped to one symbol.

6. A transmission method as claimed in claim 1, wherein the bits of one of the first and second bit classes are mapped to a given reliability if positions of the reliability are available.

7. A transmission method as claimed in claim 1, wherein the bits within an individual class are mapped to several reliabilities such that the bits are substantially evenly distributed to the several reliabilities.

8. A transmission method as claimed in claim 1, wherein the method is adapted for transmitting data in a mobile radio network from a central unit of the network to a terminal of the network.

9. A transmission method as claimed in claim 8, wherein the mobile radio network is operated according to a UMTS standard.

10. A bit distribution method, wherein at least a first and a second class of bits are mapped to different positions within a symbol, the method comprising the steps of:
linking a position within the symbol with a transmission reliability;
providing that at least two different values of the transmission reliability exist;
wherein mapping of the bits comprises the steps of:
establishing a ($N_{row}*N_{col}$) matrix with $N_{row}$ rows and $N_{col}$ columns, having ($N_{row}*N_{col}$) total entries, whereby all entries in a same row are connected with a same value of the transmission reliability;
determining a number $N_{t,sys}$ of bits of the first bit class and allocating a respective number of entries in the matrix row-by-row, thus allocating the first $N_c$ columns with $N_{r+1}$ rows and, if $N_r>0$, allocating the remaining ($N_{col}-N_c$) columns with $N_r$ rows, where $$N_c = \left(\frac{N_{t,sys}}{N_{col}} - N_r\right) \cdot N_{col} = N_{t,sys} - N_r \cdot N_{col} \text{ and } N_r = \left\lfloor \frac{N_{t,sys}}{N_{col}} \right\rfloor$$

and, if $N_c=0$, allocating all columns with $N_r$ rows; and
filling the allocated entries with the bits of the first class of bits column-by-column.

* * * * *